(12) United States Patent
Graunke et al.

(10) Patent No.: US 7,190,787 B1
(45) Date of Patent: Mar. 13, 2007

(54) STREAM CIPHER HAVING A COMBINER FUNCTION WITH STORAGE BASED SHUFFLE UNIT

(75) Inventors: Gary L. Graunke, Hillsboro, OR (US); Carl M. Ellison, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/452,329

(22) Filed: Nov. 30, 1999

(51) Int. Cl.
*H04L 9/00* (2006.01)
*H04K 1/00* (2006.01)

(52) U.S. Cl. .................................. 380/42; 380/255
(58) Field of Classification Search ............... 380/37, 380/42, 43, 44, 29, 212; 713/181; 708/250
See application file for complete search history.

(56) References Cited

U.S. PATENT DOCUMENTS

| | | | | |
|---|---|---|---|---|
| 4,316,055 A | * | 2/1982 | Feistel ...................... | 380/37 |
| 4,802,217 A | * | 1/1989 | Michener .................. | 380/29 |
| 4,815,130 A | * | 3/1989 | Lee et al. .................. | 380/265 |
| 5,323,338 A | * | 6/1994 | Hawthorne ................ | 708/250 |
| 5,341,425 A | * | 8/1994 | Wasilewski et al. ........ | 380/212 |
| 5,566,099 A | * | 10/1996 | Shimada .................... | 708/250 |
| 5,577,124 A | * | 11/1996 | Anshel et al. .............. | 380/46 |
| 5,598,154 A | * | 1/1997 | Wilson et al. .............. | 341/50 |
| 5,703,952 A | * | 12/1997 | Taylor ....................... | 380/44 |
| 5,751,808 A | * | 5/1998 | Anshel et al. .............. | 713/168 |
| 6,069,954 A | * | 5/2000 | Moreau ...................... | 380/28 |
| 6,128,737 A | * | 10/2000 | Jakubowski et al. ........ | 713/181 |
| 6,192,385 B1 | * | 2/2001 | Shimada .................... | 708/250 |
| 6,351,539 B1 | * | 2/2002 | Djakovic .................... | 380/268 |
| 6,490,354 B2 | * | 12/2002 | Venkatesan et al. ......... | 380/43 |
| 6,587,562 B1 | * | 7/2003 | Jansen et al. ............... | 380/262 |

OTHER PUBLICATIONS

Bruce Schneier. Applied Cryptography: Ptocols, Algorithms, and Source Code in C. 1996. John Wiley & Sons, Inc. $2^{nd}$ Edition. p. 379-428.*
Ernesto Cruselles et al. An Overview of Security in Eurocrypt Conditional Access System. 1993. IEEE. p. 188-193.*

* cited by examiner

*Primary Examiner*—Christopher Revak
*Assistant Examiner*—Christian La Forgia
(74) *Attorney, Agent, or Firm*—Justin B. Scout

(57) ABSTRACT

A stream cipher is provided with a first and a second data bit generators to generate in parallel a first and a second stream of data bits. The stream cipher is further provided with a combiner function having a shuffling unit including a storage structure to generate a pseudo random sequence, by combining the first stream of data bits with at least stochastically generated past values of the first streams of data bits, generated by using the second stream of data bits to stochastically operate the storage structure of the shuffle unit to memorize and reproduce the data bits of the first stream.

20 Claims, 3 Drawing Sheets

STREAM CIPHER HAVING A COMBINER FUNCTION WITH STORAGE BASED SHUFFLE UNIT

BACKGROUND OF THE INVENTION

1. Field of the Invention

The present invention relates to the field of cryptography. More specifically, the present invention relates to the robustness of stream ciphers.

2. Background Information

Crytographic ciphers can be broadly divided into block ciphers and stream ciphers. Block ciphers cipher a block of plain text into ciphered text by applying multiple successive rounds of transformation to the plain text, using a cipher key. An example of a block cipher is the well known DES cipher. Stream ciphers cipher a stream of plain data into ciphered data by combining the stream of plain data with a pseudo random sequence dynamically generated using a cipher key. An example of a stream cipher is the well known XPF/KPD cipher.

Most stream ciphers employ one or more linear feedback shift registers (LFSR). In various applications, it is desirable to employ multiple LFSRs to increase the robustness of a stream cipher. However, employment of multiple LFSRs requires employment of a combiner function to recombine the multiple data bits output by the LFSRs. Most combiner functions known in the art are inefficient in their real estate requirement for hardware implementations. Thus, a robust stream cipher with a more efficient combiner function is desired.

SUMMARY OF THE INVENTION

A stream cipher is provided with a first and a second data bit generators to generate in parallel a first and a second stream of data bits. The stream cipher is further provided with a combiner function having a shuffling unit including a storage structure to generate a pseudo random sequence, by combining the first stream of data bits with at least stochastically generated past values of the first stream of data bits, generated by using the second stream of data bits to stochastically operate the storage structure of the shuffle unit to memorize and reproduce the data bits of the first stream.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
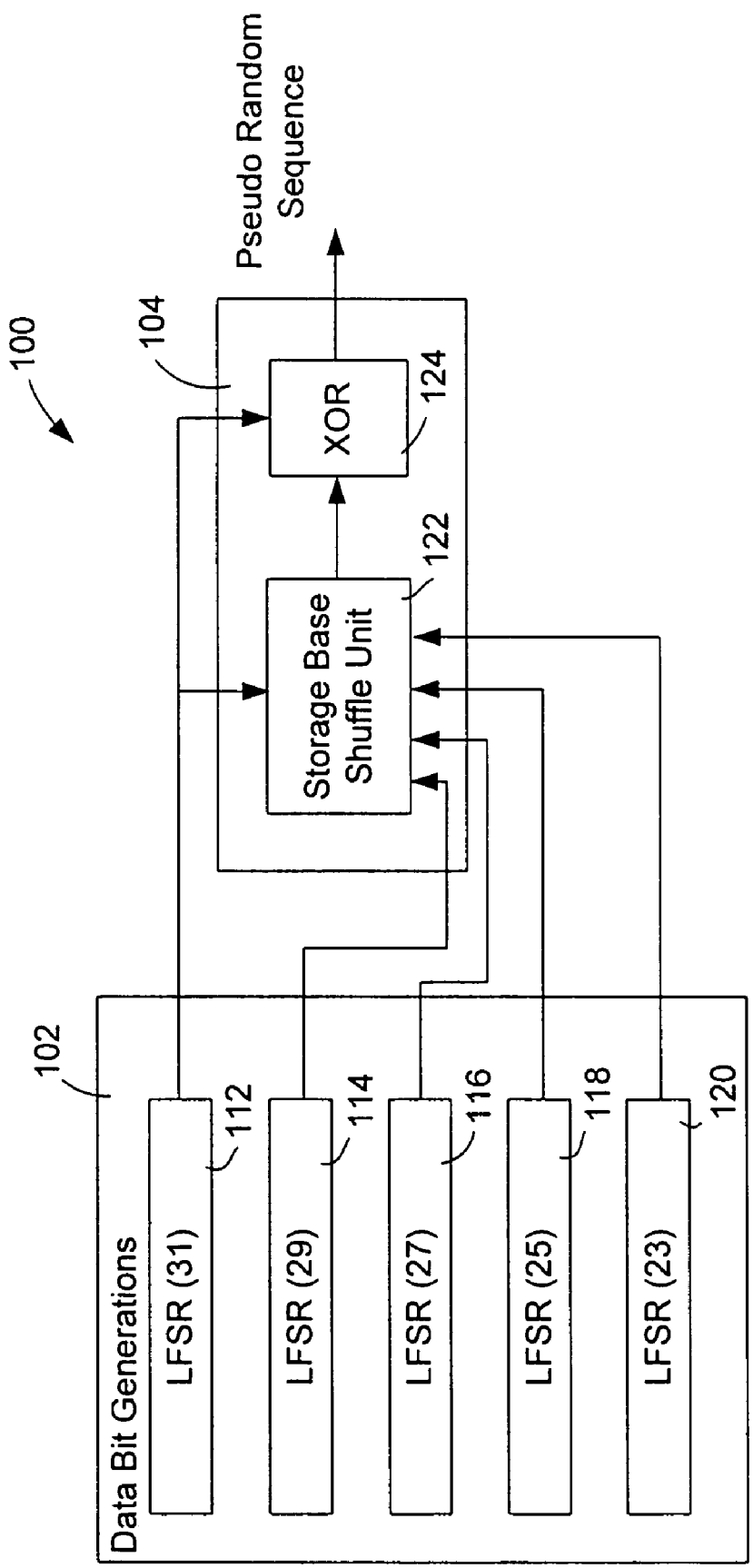
FIG. 1 illustrates an overview of the stream cipher of the present invention, in accordance with one embodiment.

Referring now to FIG. 1, wherein a block diagram illustrating the stream cipher of the present invention, in accordance with one embodiment, is shown. As illustrated, stream cipher 100 includes a number of data bit generators 102 and a combiner function 104 coupled to each other as shown. Data bit generators 102 are initialized with an initial vector and a key. Upon initialization, data bit generators 102 are used to generate a number of streams of data bits, and the generated data bit streams are provided to combiner function 104. Combiner function 104 in turn generates a pseudo random sequence using the provided data bit streams. More specifically, the sequence is generated by modifying one of the provided streams of data bits with at least stochastically selected past values of the stream. The stochastic selection is effectuated based on the other streams. For the illustrated embodiment, in addition to the stochastically selected past values of the stream, the stream is further modified by the other streams.

As illustrated, data bit generators 102 may be formed with linear feedback shift registers (LFSR), complementary in number to the "capacity" of combiner function 104 (to be explained more fully later). For the illustrated embodiment, data bit generators 102 are formed with five linear feedback shift registers (LFSR) 112–120. Combiner function 104 is formed with a storage unit based shuffling unit 122 and an XOR function 124. Storage unit based shuffling unit 122 includes storage locations that can be selectively written into and read from. The number of storage locations included is complementary to the number of LFSRs employed to form data bit generators 102. For the illustrated 5 LFSR embodiment, storage unit base shuffling unit 122 is equipped with at least 16 storage locations that can be selectively written into and read out of, using 4 of the 5 provided streams of data bits generated by LFSR 112–120.

Upon initialization with the key and the initial vector, LFSR 112–120 is operated to generate five streams of data bits for combiner function 104. Shuffling unit 122 shuffles one stream of data bits by stochastically storing the data bits into its storage locations, and at the same time, retrieving the previously stored data bits in the storage locations being written over, in accordance with the data bits of the remaining four streams. The retrieved past values are in turn used by XOR function 124 to modify the same stream of data bits, to generate the pseudo random sequence. For the illustrated embodiment, in addition to the retrieved past values of the stream, the XOR function also uses the other streams, streams generated by LFSR 114–120, to modify the stream.

As will be appreciated by those skilled in the art, more or less LFSR and storage locations may be used to practice the present invention, as long as their capacities remain complementary to each other. In one embodiment, the five LFSR 112–120 are uneven in length. More specifically, their lengths are 31 bits, 29 bits, 27 bits, 25 bits and 23 bits. Additionally, each LFSR 112, 114, 116, 118 or 120 includes 8 taps. The tap positions are preferably spread out, in one embodiment, accordingly to the following position table:

| LFSR | Tap positions |
| --- | --- |
| LFSR (31 bit) | 31, 25, 21, 17, 13, 11, 6, 1 |
| LFSR (29 bit) | 29, 24, 18, 17, 12, 9, 5, 1 |
| LFSR (27 bit) | 27, 23, 19, 15, 11, 7, 4, 1 |
| LFSR (25 bit) | 25, 21, 8, 14, 12, 8, 5, 1 |
| LFSR (23 bit) | 23, 18, 15, 12, 11, 8, 4, 1 |

Figure 2:
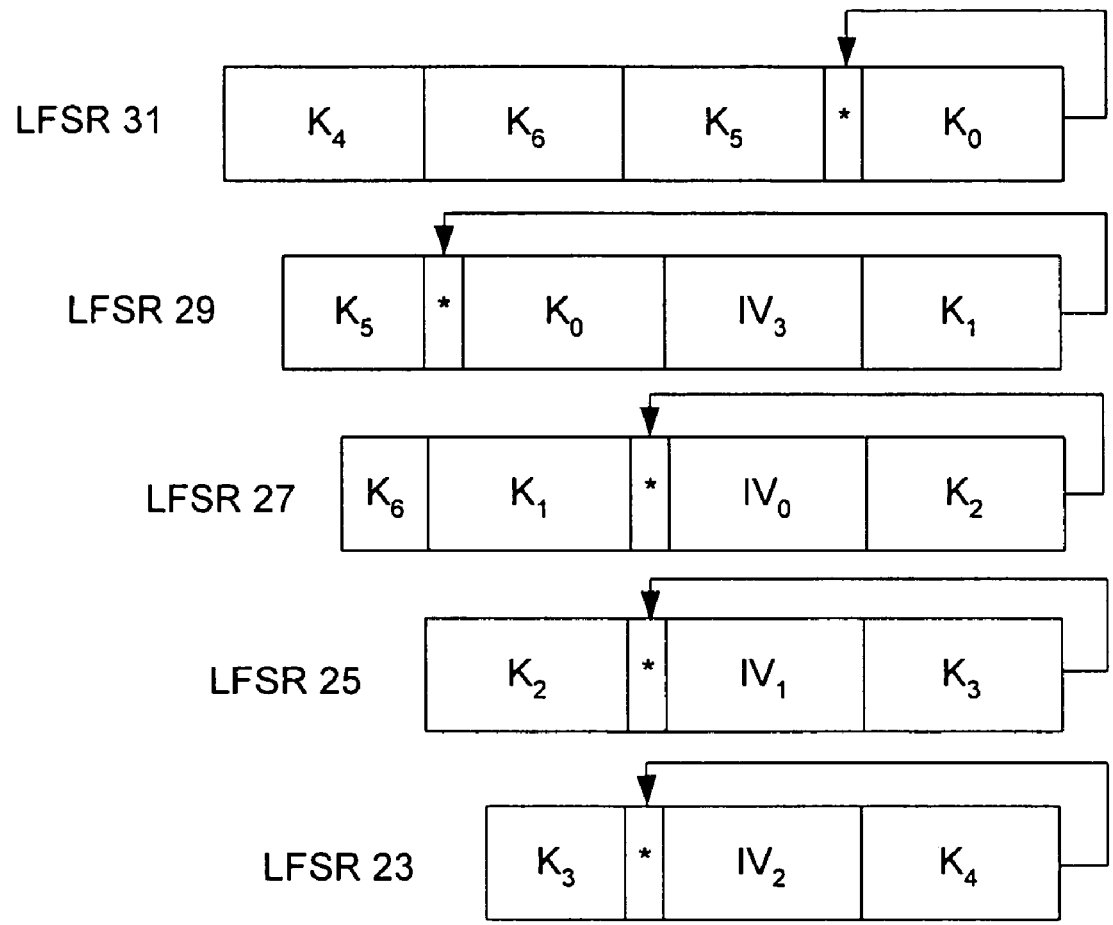
FIG. 2 illustrates a manner in which the LFSRs of FIG. 1 are initialized, in accordance with one embodiment.

FIG. 2 illustrates a manner in which LFSR 112–120 are initialized with a key and an initial vector, in accordance with one embodiment. For the illustrated embodiment, the initial key is assumed to be 56 bits in size, whereas the initial vector is assumed to be 32 bits in size. Both the initial key as well as the as the initial vectors are sub-divided into 8-bit chunks, i.e. Key=K6+K5+K4+K3+K2+K1+K0, and Initial Vector (IV)=IV3+IV2+IV1+IV0 (with K0 and IV0 being the least significant bits (LSB)). As illustrated, the 31-bit LFSR is initialized with K0, the complement of the LSB of K0, K5, K6 and a truncated K4, whereas the 29-bit LFSR is initialized with K1, IV3, K0, the complement of the LSB of K1, and a truncated K5. Similarly, the 27-bit LFSR is initialized with K2, IV0, the complement of the LSB of K2, K1 and a truncated K6, whereas the 25-bit LFSR is initialized with K3, IV1, the complement of the LSB of K3, and K2. Finally, the 23-bit LFSR is initialized with K4, IV2, the complement of the LSB of K4, and a truncated K3. In alternate embodiments, keys and initial vectors of other lengths as well as other segmentation and loading strategies may be employed instead.

Figure 3A:
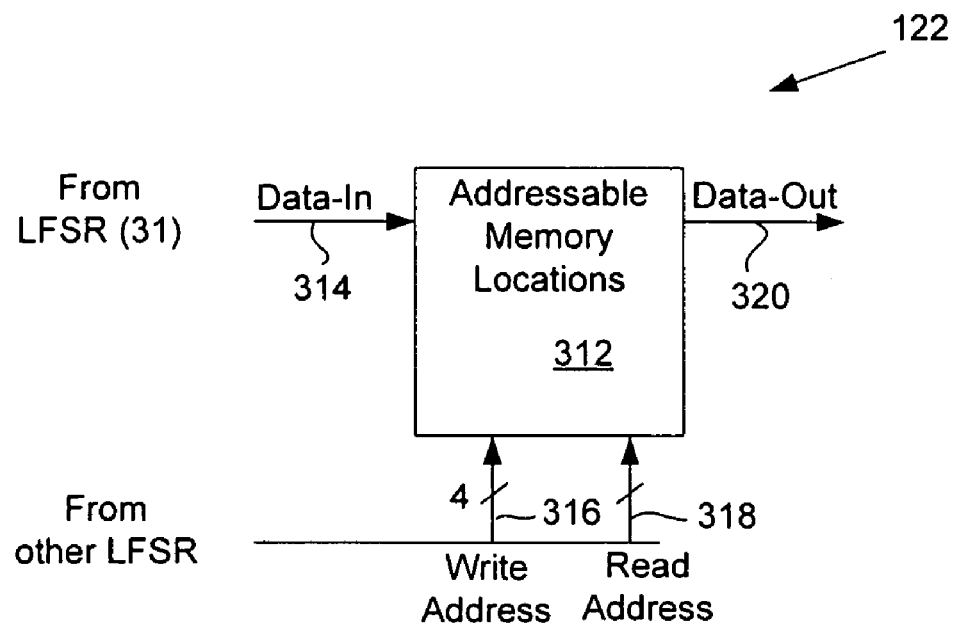
FIGS. 3a–3b illustrate the shuffle unit of FIG. 1 in further detail, in accordance with two embodiments.
Figure 3B:
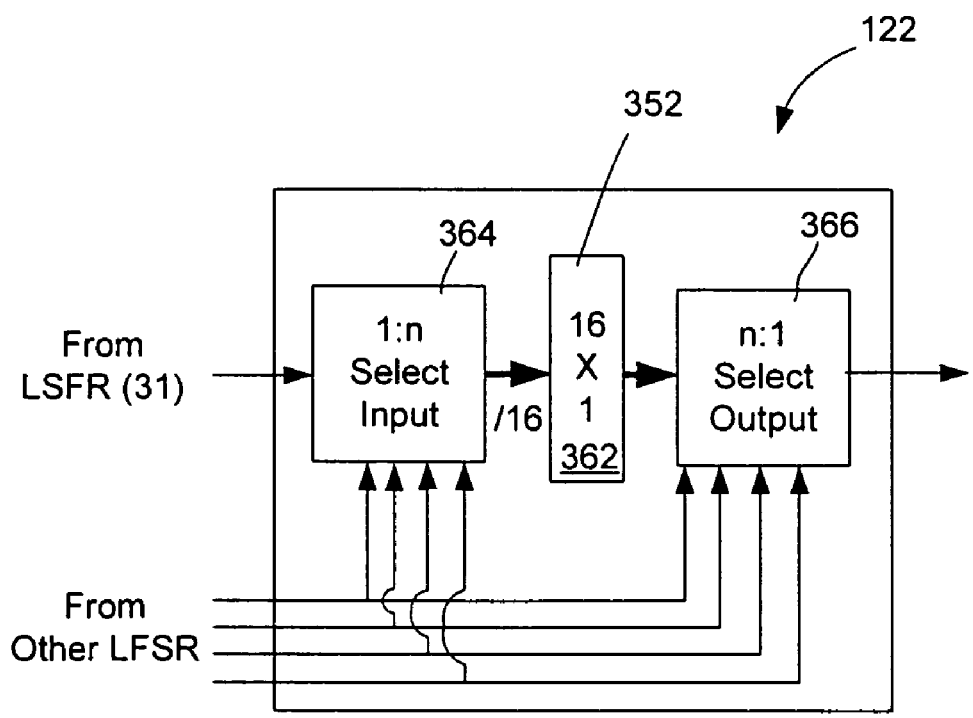

FIGS. 3a–3b illustrate shuffle unit 122 in further detail in accordance with two embodiments. For the embodiment of FIG. 3a, shuffle unit 122 includes memory unit 302 having 16 addressable memory locations 312, data input port 314, four write address pins 316, four read address pins 318 and data output port 320, thereby allowing the data bits streams generated by the LFSR 114–120 to stochastically control the writing of data bit stream generated by LFSR 112 into memory locations 312 as well as retrieving past values of the data stream previously stored in memory locations 312. As earlier described, the past values are retrieved from the same storage locations being written into with new data values.

For the embodiment of FIG. 3b, shuffle unit 122 includes memory unit 352 having 16 memory locations 362, 1 to n de-multiplexor 364, and n to 1 multiplexor 366 (n being equal to 16 in this case), thereby also allowing the data bits streams generated by the LFSR 114–120 to stochastically control the writing of the data bit stream generated by LFSR 112 into memory locations 352 as well as retrieving past values of the data stream previously stored in memory locations 352. Again, the past values are retrieved from the same storage locations being written into with new data values.

EPILOGUE

From the foregoing description, those skilled in the art will recognize that many other variations of the present invention are possible. Thus, the present invention is not limited by the details described, instead, the present invention can be practiced with modifications and alterations within the spirit and scope of the appended claims.

What is claimed is:

1. An apparatus for producing a pseudo random sequence, comprising:
a data bit generator to produce a principal data stream;
multiple data bit generators to create additional data streams;
a storage structure responsive to the additional data streams having multiple bit storage locations to store the bits of the principal data stream in the storage locations in a pseudo random order based on an order of bits in the additional data streams; and
a shuffle unit coupled with the data bit generators to modify the principal data stream by combining the bits of the principal data stream with past bits of the principal data stream stored in the storage structure and pseudo randomly selected from the storage structure based on an order of the bits in the additional data streams to produce a pseudo random sequence.

2. An apparatus according to claim 1, wherein the data bit generators comprise linear feedback shift registers.

3. An apparatus according to claim 1, wherein the storage unit has a number of addressable bit locations and wherein the additional data streams control write address and read address ports that control access to the number of addressable bit locations.

4. An apparatus according to claim 3, wherein the number of addressable bit locations is a number that has a base 2 relationship with the number of multiple data bit generators.

5. An apparatus according to claim 1, wherein the shuffle unit includes a 1 to n (n an integer greater than 1) de-multiplexer having an input line coupled to the data bit generator that produces the principal data stream, control lines, at least one of which is coupled to one of the multiple data bit generators, and n output lines coupled to the storage structure.

6. An apparatus according to claim 1, wherein the shuffle unit includes an n to 1 (n an integer greater than 1) multiplexer having n input lines coupled to the storage structure, an output line, and control lines, at least one of which is coupled to one of the multiple data bit generators.

7. An apparatus according to claim 1, wherein the shuffle unit further includes a bit-wise XOR circuit, an input of which receives the bits of the principal data stream and an input of which receives the pseudo randomly selected bits, the output of which is the pseudo random sequence.

8. A method for generating a data stream, comprising:
generating a first and a second bit sequence;
storing bits from the first sequence in a memory structure;
retrieving stored bits of the first sequence from the memory structure in a stochastic order, the order based at least in part on a bit order of the second sequence;
bit-wise modifying the bits of the first sequence with the stochastically retrieved bits to produce a pseudo random data stream.

9. A method according to claim 8, wherein generating the first and second bit sequences comprises generating at least one of the first and the second bit sequences with a linear feedback shift register.

10. A method according to claim 8, wherein storing bits from the first sequence in a memory structure comprises writing to bit-addressable memory locations in the memory structure an address selected output of a 1 to n (n being an integer greater than 1) de-multiplexer, the input of the multiplexer being the first bit sequence, and the address selection controlled by an order of bits in the second bit sequence.

11. A method according to claim 8, wherein retrieving stored bits in the stochastic order from the memory structure comprises retrieving an output of an n to 1 (n being an integer greater than 1) multiplexer, the n address selectable inputs of the multiplexer corresponding to n bit-addressable memory locations in the memory structure, and the address selection controlled by an order of bits in the second bit sequence.

12. A method according to claim 8, wherein bit-wise modifying the bits of the first sequence comprises logically XOR-ing the bits of the first bit sequence with the stochastically retrieved bits.

13. A method according to claim 8, further comprising generating additional bit sequences, wherein storing and retrieving bits to/from the memory structure comprise storing and retrieving in a stochastic order based on a combined bit order of the second and the additional bit sequences.

14. A stream cipher generator comprising:
a first data bit generator to produce a first stream of data bits;
a memory having a read and write port to receive and store bits from the first stream of data bits;
a second data bit generator to produce a second stream of data bits;
a read and write port controller coupled to the memory and responsive to the second stream of data bits, to control the read and write functions of the memory based, at least in part, on the sequence of bits in the second stream of data bits; and
a combiner to receive the first stream of data bits and the bits read from the memory, and modify the first stream of data bits with the bits read from the memory to produce a pseudo random sequence.

15. A stream cipher generator according to claim 14, wherein at least one of the first and the second data bit generators comprise a linear feedback shift register.

16. A stream cipher generator according to claim 14, wherein the memory further includes a bit-addressable address selection port.

17. A stream cipher generator according to claim 16, wherein the read and write port controller further comprises a 1 to n (n being an integer greater than 1) de-multiplexer, the de-multiplexer input coupled to the first data bit generator, the n outputs coupled to n bit locations of the bit-addressable memory, and a control line coupled to the second data bit generator to make the address selection responsive to an order of bits in the second stream of data bits.

18. A stream cipher generator according to claim 16, wherein the read and write port controller further comprises an n to 1 (n being an integer greater than 1) multiplexer, the n multiplexer inputs coupled to n locations of the bit-addressable memory, the multiplexer output coupled to the combiner, and a control line coupled to the second data bit generator to make the address selection responsive to an order of bits in the second stream of data bits.

19. A stream cipher generator according to claim 16, further comprising additional data bit generators, and wherein the read and write port controller controls the read and write functions of the memory based on a sequence of bits of the combination of the second stream of data bits and data streams generated by the additional data bit generators.

20. A stream cipher generator according to claim 14, wherein the combiner comprises a bit-wise XOR circuit to XOR the bits of the first stream of data bits with the bits read from the memory, and the XOR output comprises the pseudo random sequence.

* * * * *